Nov. 10, 1925.

H. L. BLOOD

CONTROL SYSTEM

Filed May 24, 1923

INVENTOR
H. L. Blood.
BY
Wayne B. Wells
ATTORNEY

Nov. 10, 1925.  
H. L. BLOOD  
1,560,652  
CONTROL SYSTEM  
Filed May 24, 1923  
2 Sheets-Sheet 2
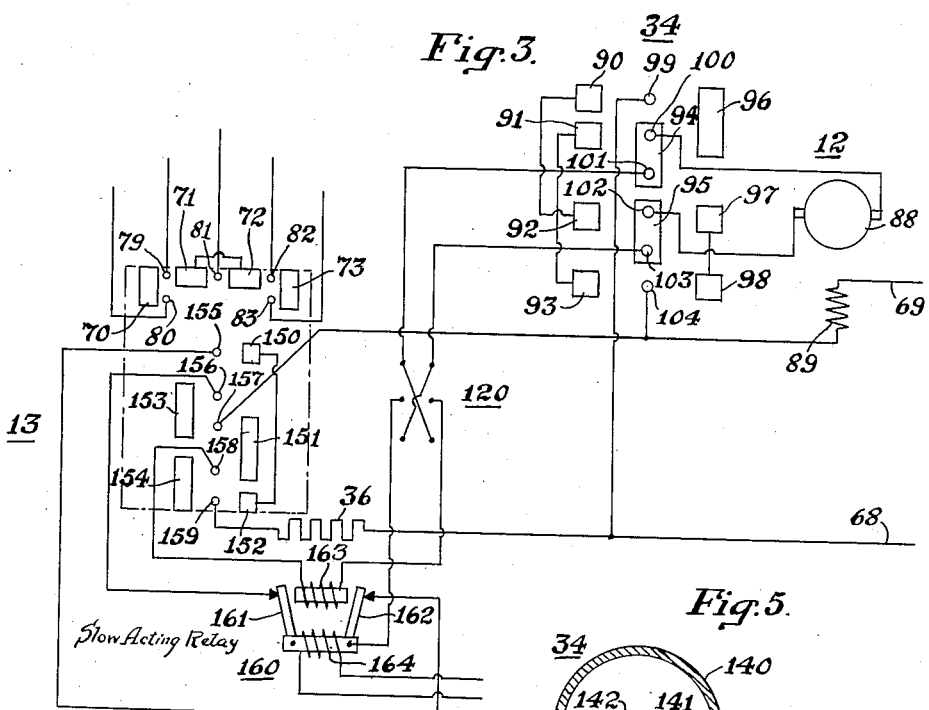
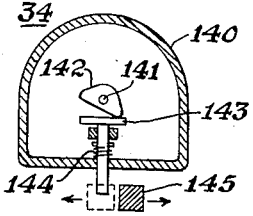
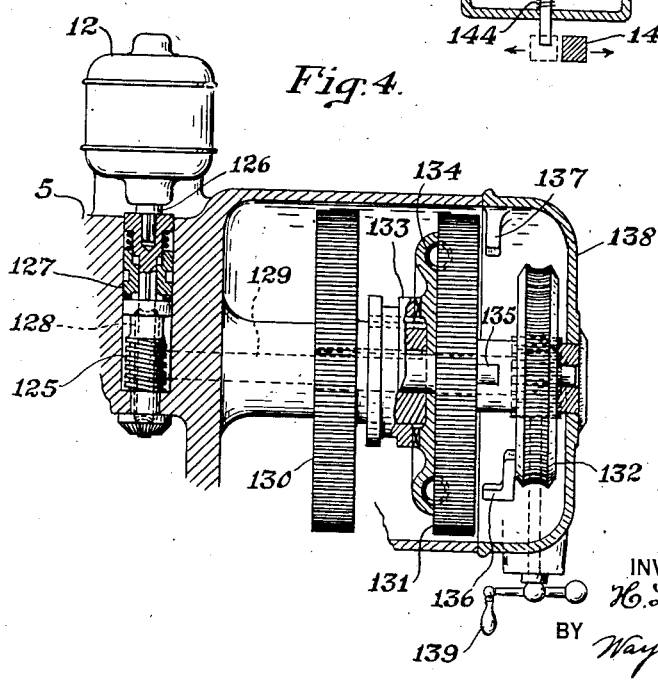
INVENTOR  
H. L. Blood.  
BY Wayne B Wells  
ATTORNEY Patented Nov. 10, 1925.

1,560,652

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed May 24, 1923. Serial No. 641,164.

*To all whom it may concern:*

Be it known that I, HAROLD L. BLOOD, a citizen of the United States, residing at North Plainfield, in the county of Somerset and State of New Jersey, have invented certain new and useful Improvements in Control Systems, of which the following is a specification.

My invention relates to control systems and particularly to control systems for operating planers and other machine tools of a similar character.

One object of my invention is to provide a control system that shall reverse the direction of rotation of a motor in accordance with the operation of a periodically moved member and that shall mechanically stop the motor prior to each reversal of the circuit connections thereof while insuring against an excessive current flow through the motor during such period.

Another object of my invention is to provide a control system for a machine tool that shall mechanically stop a motor before each end of the stroke of a reciprocating member, while maintaining a resistor in the motor circuit to insure against excessive current flow therethrough, and that shall start the motor at each end of the stroke of the reciprocating member.

A further object of my invention is to provide a control system for operating a planer or other machine tool that shall stop the feed motor before each end of the stroke of the reciprocating member irrespective of the circuit connections of the feed motor, that shall open the motor circuit in case the motor is stopped an excessive length of time, and that shall automatically start the motor at each end of the stroke of the reciprocating member.

At the present time it is customary to operate planers and similar machine tools electrically and to control the circuit not only of the main motor but also of the feed motor in accordance with the operation of the reciprocating work carrying table. A pilot switch is operated at each end of the stroke of the work carrying table to not only reverse the direction of rotation of the main motor but also to start the feed motor and to reverse the direction of rotation thereof. The feed motor is started at each end of the stroke of the table and is stopped by means of a so-called limit switch. The limit switch serves to open the feed motor circuit and to prepare a circuit for operating such motor in a reverse direction.

In a control system constructed in accordance with my invention, the feed motor, during feeding operation, is mechanically stopped before each end of the stroke of the reciprocating member or work carrying table. At the end of the stroke of the work carrying table, a pilot switch is operated for reversing the direction of rotation of the main motor and also for operating the feed motor in an opposite direction. A resistor is included in the circuit of the feed motor to insure against an excessive current flow therethrough when it is mechanically stopped to limit the feeding movement. Moreover, means are provided for opening the feed motor circuit in case the motor is stopped an excessive length of time. In the drawings a slow-acting polarized relay is shown for insuring against stopping the motor for an excessive length of time with the circuit thereof closed. Such relay serves not only to open the motor circuit in case the motor is stopped an excessive length of time but also to prepare a circuit for operating the motor in a reverse direction.

A traverse switch is provided for effecting traverse operation of the feed motor in a forward and in a reverse direction and for connecting such motor to the pilot switch for operating it in accordance with the movement of the reciprocating work carrying table. In the central position of the traverse switch, the motor is connected through a resistor to the pilot switch and in each position adjacent to the central position, the motor is connected directly to the supply circuit independently of such resistor and the pilot switch.

The control system disclosed in this application is closely related to the control system disclosed in the application of Roswell H. Rausch, Serial No. 655,738 filed August 24, 1923 and is adapted to operate a planer similar to the planer disclosed in the application of H. L. Blood et al. Serial No. 650,421 filed July 9, 1923.

In the accompanying drawings:

Fig. 3 is a diagrammatic view of a modification of my invention.

Fig. 4 is a sectional view illustrating the mechanism for mechanically stopping the motor.

Fig. 5 is a sectional view illustrating the mechanical interlock associated with the traverse switch.

Figure 1:
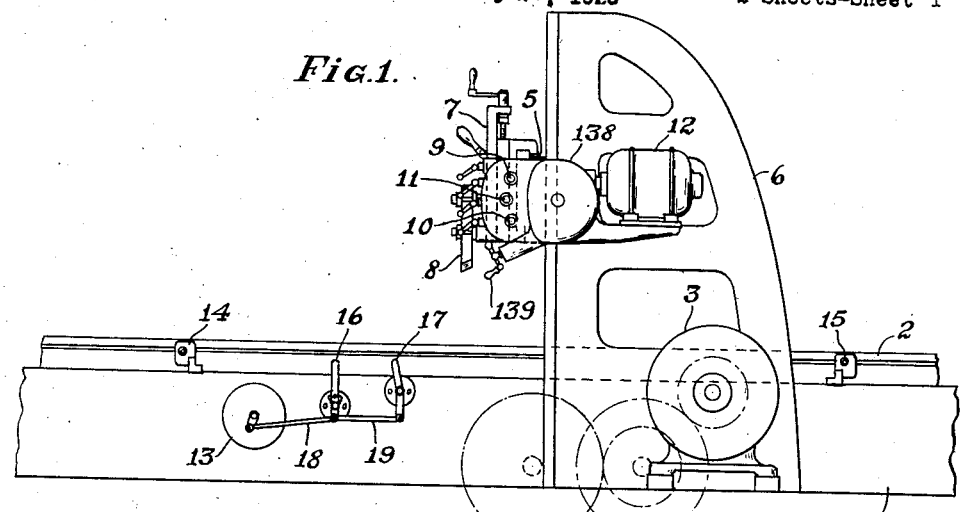
Figure 1 is a fragmentary side elevational view of a planer adapted to be operated by a control system embodying my invention.

Referring to Fig. 1 of the drawings, the bed 1 of a planer supports a reciprocating work carrying table 2 which is preferably operated by means of a main motor 3. The main motor 3 is connected to the reciprocating table by any suitable gearing 4 and is operated in a manner to be hereinafter set forth. A cross rail 5, which is mounted on uprights 6 carries one or more tool heads 7. Suitable cutting tools 8 are carried on the heads 7. The customary shafts 9 and 10 are provided for moving the heads 7 along the cross rail and a shaft 11 is provided for effecting vertical movement of the heads on the cross rail. An auxiliary or feed motor 12, which is mounted on the cross rail, is connected to the shafts 9, 10 and 11 as set forth in the copending application of H. L. Blood et al., Serial No. 650,421. Inasmuch as a detailed description of the mechanical connections of the feed motor 12 to the various parts of the planer mechanism is given in the copending application, a detailed description of such mechanism in this application is deemed unnecessary.

A pilot switch 13, which is mounted on the side of the bed 1, is adapted to control the operation of the main motor 3 and the feed motor 12 in accordance with the movement of the reciprocating work carrying table 2. The pilot switch 13 is operated by two adjustable dogs 14 and 15 which are mounted on the table 2. The dogs 14 and 15 are adapted to engage levers 16 and 17 at the ends of the planer stroke. The levers 16 and 17 are connected to the pilot switch by means of links 18 and 19. At the end of the cutting or forward stroke, the dog 14 engages the lever 16 for reversing the position of the pilot switch and at the end of the return stroke, the dog 15 engages the lever 17 for changing the position of the pilot switch. The direction of rotation of the main motor 3 and of the feed motor 12 is reversed at each end of the planer stroke.

Figure 2:
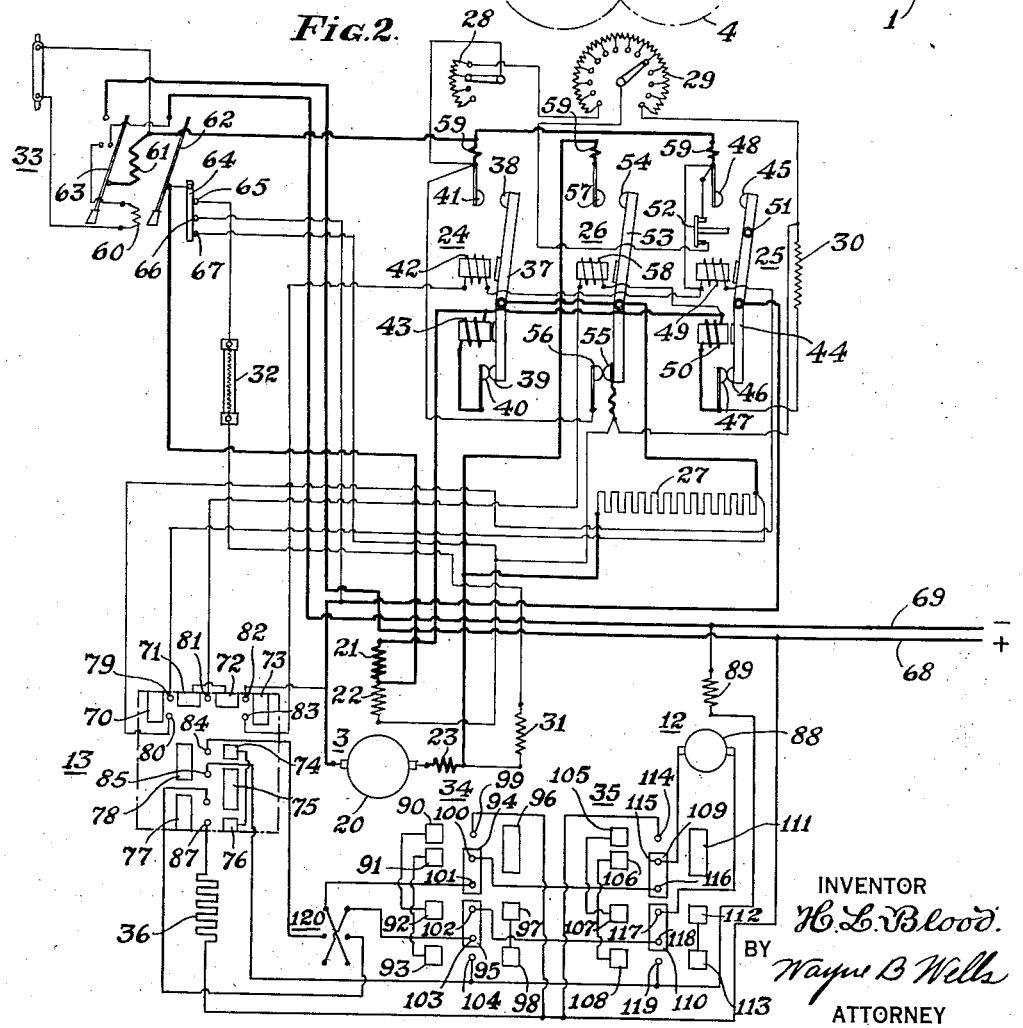
Fig. 2 is a diagrammatic view of a control system embodying my invention.

Referring to Fig. 2 of the drawings, the main motor 3 comprises an armature 20, a series field magnet winding 21, a shunt field magnet winding 22, and an interpole winding 23. The motor 3 is controlled by two unit switches 24 and 25. The unit switch 24 is operated to effect movement of the table 2 in a forward or cutting direction and the unit switch 25 is operated to effect a return movement of the table 2. The unit switches 24 and 25, when in released position, also serve to complete a dynamic braking circuit through the main motor 3.

An accelerating switch 26 is provided for short circuiting a resistor 27 to effect acceleration of the main motor 3. Two resistors 28 and 29 are provided in the circuit of the shunt field magnet winding 22 to vary the speed of the main motor 3 according to the direction of rotation thereof. A choke resistance 30 is provided in the circuit of the shunt field magnet winding for protecting such winding against inductive discharges. Moreover, the main motor is provided with an emergency winding 31 which is connected in circuit with an emergency resistor 32 upon opening of the circuit breaker by reason of over-load or low voltage circuit conditions.

An under-load and over-load circuit breaker 33 of any suitable type is provided in circuit with the feed motor 12 and the main motor 3. The feed motor 12 is not only controlled by the pilot switch 13 but is adapted to be controlled by either one of two traverse switches 34 and 35. A resistor 36, to be hereinafter described, is inserted in circuit with the feed motor 12 during feeding operation.

The unit switch 24 comprises a pivotally mounted switch arm 37 which carries two contact members 38 and 39. The contact member 39 engages a stationary contact member 40 when the switch is in a released position. The contact member 38 engages a stationary contact member 41 when the switch is in an operative position. A main magnet 42 is provided for operating the switch arm 37 and an auxiliary or holding magnet 43 is provided not only to prevent the operation of the unit switch 24 when the unit switch 25 is operated but also to prevent operation of the unit switch 24 when a dynamic braking current is flowing through the main motor 3.

The unit switch 25 comprises a pivotally mounted switch arm 44 which carries two contact members 45 and 46. The contact member 46 is adapted to engage a stationary contact member 47 when the switch arm is in a released position, as shown in Fig. 2 of the drawings. The contact member 45 is adapted to engage a stationary contact member 48 when the switch arm is in an operative position. A main magnet 49 is provided for operating the switch arm 44 in accordance with the operation of the pilot switch 13 by the table 2. A holding coil 50, similar to the holding coil 43, is provided for preventing the operation of the unit switch 25 when the unit switch 24 is operated and also for preventing operation of the unit switch 25 when a dynamic braking current is flowing through the main motor.

A pin 51, which projects from the side of the switch arm 44, is adapted to open a switch 52 upon operation of the unit switch 25. If the accelerating switch 26 is in an operative position upon operation of the switch 52, the resistors 29 and 28 are inserted in circuit with the shunt field magnet winding 22 of the main motor. The resistors 28 and 29 are inserted in the shunt field magnet winding to increase the speed of the return stroke of the planer table.

The accelerating switch 26 comprises a pivotally mounted switch arm 53 which carries two contact members 54 and 55. The contact member 55 is insulated from the switch arm 53 and is adapted to engage a stationary contact member 56 when the switch arm is in a released position. The contact member 54 is adapted to engage a stationary contact member 57 when the switch arm 53 is in an operative position. A main magnet 58 is provided for operating the switch arm 53 to short circuit the resistor 27. Three blow-out coils 59 are provided for extinguishing the arcs formed by the upper contact members of the main unit switches 24 and 25 and the accelerating switch 26.

The circuit breaker 33 embodies a low voltage coil 60, an over-load coil 61 and two switch blades 62 and 63. A switch arm 64 is provided which serves to bridge contact members 65, 66 and 67 upon release of the circuit breaker. The circuit breaker is connected to a supply circuit comprising conductors 68 and 69. The pilot switch 13 comprises contact segments 70 to 78, inclusive, which are adapted to engage contact fingers 79 to 87, inclusive, for controlling the operation of the main motor 3 and the feed motor 12. The feed motor 12 comprises an armature 88 and a field magnet winding 89.

The traverse switch 34 comprises contact segments 90 to 98, inclusive, which are adapted to engage contact fingers 99 to 104, inclusive. The traverse switch 35 is similar in construction to the traverse switch 34. The two traverse switches 34 and 35 are preferably mounted on the ends of the rail 5 so that traversing of the cutting tools may be effected from either side of the planer. The traverse switch 35 comprises contact segments 105 to 113, inclusive, which are adapted to engage contact fingers 114 to 119, inclusive. A suitable reversing switch 120 is inserted in circuit with the feed motor 12.

Referring to Fig. 4, the mechanism for mechanically stopping the feed motor 12 before the end of each stroke of the planer table is illustrated. The motor 12, which is suitably mounted on the rail 5 of the planer, carries a worm member 125 on an armature shaft 126. The worm member 125 is rotatably mounted on the shaft 126 and is adapted to be connected thereto by means of a clutch member 127. A worm wheel 128, which is mounted on a shaft 129, meshes with the worm member 125. The shaft 129 carries a traverse gear 130, a feed gear 131, and an adjusting worm gear 132. The traverse gear 130 serves to effect a traverse operation in the manner set forth in the companion application. The feed gear wheel 131 is rotatably mounted on the shaft 129 and is adapted to be conected thereto by means of a clutch 133. A suitable resilient connection 134 is provided in the connection between the gear wheel 131 and the shaft 129. Such resilient connection is provided in order to take up the shock of mechanically stopping the motor 12 to limit each feeding movement. The gear wheel 131 carries a stop member 135 which is adapted to operate between an adjustable stop 136 and a fixed stop 137. The fixed stop 137 is attached to the casing 138 which projects from the rail 5. The adjustable stop 136 is mounted on the worm wheel 132. The worm wheel 132 is operated by a handle 139 in order to adjust the position of the stop 136 and thus vary the amount of each feeding movement. For a more complete description of the mechanism for limiting the movement of the feed motor, reference may be made to the copending application of Blood et al. Serial No. 650,421.

Each of the traverse switches is provided with a mechanical interlock in order to prevent movement thereof except when the planer mechanism is in predetermined position. Referring to Fig. 5 of the drawings, the interlock for the traverse switch 34 is shown in section. The switch comprises a casing 140 and a drum shaft 141 which carries the contact segments and which is suitably mounted in the casing 140. A cam member 142, which is fixedly mounted on the shaft 141, engages the head of a plunger 143. The plunger 143 is resliently held in engagement with the cam member 142 by means of a spring member 144. A wing member 145, which controls the clutch member 133 in the manner set forth in the companion application of Blood et al. Serial No. 650,421, is movable in the path of movement of the plunger 143. During feeding movement of the motor 12, the wing member 145 is moved into the dotted line position shown in Fig. 5 of the drawings in order to operate the clutch member 133 and to connect the gear wheel 131 to the shaft 129. In such position of the wing member 145, it is impossible to operate the traverse switch to either of its traverse positions. In Fig. 5 of the drawings, the traverse switch is illustrated in a traverse position.

Assuming the two traverse switches 34 and 35 to be in the feed positions, as shown in Fig. 2 of the drawings, and the pilot switch 13 to be moved towards the right as shown in Fig. 2 of the drawings, circuits will be completed for operating the main motor 3 to effect a return stroke of the planer table 2. A circuit for energizing the magnet 49 of the unit switch 25 is completed which extends from the supply conductor 69 through the switch blade 62 of the circuit breaker 33, series field magnet winding 21, the holding coil 43, contact members 39 and 40, switch arm 37 of the unit switch 24, contact members 79 and 80, which are bridged by the contact segment 70 of the pilot switch 13, magnet 49, coil 61, and the switch blade 63 to the supply conductor 68.

The switch arm 44 of the unit switch 25 is operated to complete a circuit through the main motor 3. The circuit for the main motor 3 extends from the supply conductor 69 through the switch blade 62, series field magnet winding 21, holding coil 43, contact members 39 and 40, switch arm 37, resistor 27, interpole winding 23, armature 20, switch arm 44, contact members 45 and 48, coil 61, and switch blade 63 to the supply conductor 68. The motor 3 is operated in such direction as to effect movement of the planer table 2 towards the left, as shown in Fig. 1 of the drawings.

Upon operation of the unit switch 25, a circuit is completed for operating the accelerating switch 26. The circuit through the magnet 58 of the accelerating switch 26 extends from the supply conductor 69 through the switch blade 62 of the circuit breaker, series field magnet winding 21, magnet 58, contact members 81 and 82, which are bridged by the contact segments 71 and 72, switch arm 44, contact members 45 and 48, coil 61, and the switch blade 63 to the supply conductor 68. The accelerating switch 26 is operated for short circuiting the resistor 27 to accelerate the motor 3.

A circuit for the shunt field magnet winding 22 extends from the supply conductor 69 through the switch blade 62, shunt winding 22, contact members 55 and 56 of the accelerating switch, coil 61, and the switch blade 63 to the supply conductor 68. However, upon operation of the accelerating switch, the circuit of the shunt field magnet winding is changed and extends from the supply conductor 69 through the switch blade 62, shunt winding 22, resistor 29, resistor 28, coil 61, and the switch blade 63 to the supply conductor 68. Inasmuch as the resistors 28 and 29 are included in the circuit of the shunt field magnet winding, it is apparent the speed of the motor is increased to effect a relatively rapid return stroke of the planer table. The switch 52, which normally excludes the resistor 28 from the circuit of the shunt field winding, is opened by the pin 51 which projects from the arm 44 of the unit switch 25.

The pilot switch 13 also completes a circuit for operating the feed motor 12. The circuit through the feed motor extends from the supply conductor 69 through the field magnet winding 89, contact fingers 84 and 85, which are bridged by the contact segment 78, reversing switch 120, contact fingers 100 and 101, which are bridged by the contact segment 94, contact fingers 115 and 116, which are bridged by the contact segment 109, armature 88, contact fingers 117 and 118, which are bridged by the contact segment 110, contact fingers 102 and 103, which are bridged by the contact segment 95, reversing switch 120, contact fingers 86 and 87, which are bridged by the contact segment 77, and the resistor 36 to the supply conductor 68. The feeding movement of the motor 12 is continued until the stop 135 on the feed gear wheel 131 engages one of the stops 136 and 137. Upon engagement between the stop 135 and one of the stops 136 and 137, the feed motor is positively and mechanically stopped irrespective of the circuit connections of such motor. The resistor 36 is included in the circuit of the feed motor 12 in order to operate it as a torque motor. The resistor permits the motor to be stopped without causing an excessive current flow therethrough.

Near the end of the return stroke of the planer table, the dog 15 engages the lever 17 for reversing the position of the pilot switch 13. The circuits through the magnet 49 and the magnet 58 are broken to release the unit switch 25 and the accelerating switch 26. A dynamic braking circuit is completed through the main motor 3, which extends from one terminal of the armature 20 through the interpole winding 23, resistor 27, switch arm 37, contact members 39 and 40, holding coils 43 and 50, contact members 46 and 47, and the arm 44 to the other terminal of the armature 20.

In the new position of the pilot switch, a circuit is completed for operating the unit switch 24 to effect a forward or cutting stroke of the planer table 2. The circuit through the coil 42 of the unit switch 24 extends from the supply conductor 69 through the switch blade 62, field magnet winding 21, holding coil 50, contact members 46 and 47, switch arm 44, contact members 82 and 83, which are bridged by the contact segment 73, magnet 42, coil 61, and the switch blade 63 to the supply conductor 68. The unit switch 24 is operated for completing a circuit through the main motor 3. The main motor 3 is operated in such direction as to effect a movement of the planer table towards the right, as shown in Fig. 1 of the drawings. The circuit through the main motor 3 extends from the supply conductor 69 through the switch blade 62, series field magnet winding 21, holding coil 50, contact members 46 and 47, switch arm 44, armature 20, interpole winding 23, resistor 27, switch arm 37, contact members 38 and 41, coil 61, and the switch blade 63 to the supply conductor 68.

Upon operation of the unit switch 24, a circuit is completed for operating the accelerating switch 26 to short circuit the resistor 27. The circuit through the coil 58 of the accelerating switch extends from the supply conductor 69 through the switch blade 62, winding 21, magnet 58, contact members 81 and 79, which are bridged by the contact segments 71 and 72, switch arm 37, contact members 38 and 41, coil 61, and switch blade 63 to the supply conductor 68.

Upon operation of the accelerating switch 26, the direct connection of the shunt field magnet winding 22 across the supply conductors 68 and 69 is opened and the circuit through the shunt field magnet winding 22 extends from the supply conductor 69 through the switch blade 62, shunt field magnet winding 22, resistor 29, switch 52, coil 61, and switch blade 63 to the supply conductor 68. Inasmuch as only a portion of the resistor 29 is included in the circuit of the shunt field magnet winding 22, the speed of the main motor is reduced during the cutting or forward stroke.

The pilot switch 13 also completes a circuit for operating the feed motor 12 in a reverse direction. The circuit through the feed motor 12 extends from the supply conductor 69 through the series field magnet winding 89, contact members 85 and 86, which are bridged by the contact segments 75, reversing switch 120, contact members 102 and 103, which are bridged by the contact segment 95, contact fingers 117 and 118, which are bridged by the contact segment 110, armature 88, contact fingers 115 and 116, which are bridged by the contact segment 109, contact fingers 100 and 101, which are bridged by the contact segment 94, reversing switch 120, contact fingers 84 and 87, which are bridged by the contact segments 74 and 76, and the resistor 36 to the supply conductor 68. The feed motor is operated in a reverse direction to effect a feeding movement. Such feeding movement is limited, in the manner heretofore set forth, by the engagement between the stop member 135 and one of the stop members 136 and 137.

At the end of the cutting stroke, the dog 14 engages the lever 16 to again change the position of the pilot switch 13 and to repeat the above cycle of operations.

In case it is desired to effect traverse operation of the cutting tool, one of the traverse switches 34 and 35 is moved towards the right or left, as shown in Fig. 2 of the drawings, according to the direction of traverse movement desired. Inasmuch as the traverse switches 34 and 35 are similar in construction and operation, only the circuits through one of the switches, namely, the switch 34 will be traced and explained in detail.

Assuming the switch 34 is moved towards the right, as shown in Fig. 2 of the drawings, a circuit is completed through the motor 12, which extends from the supply conductor 69 through the field magnet winding 89, contact members 104 and 100, which are bridged by the contact segments 91 and 93, contact fingers 115 and 116, which are bridged by the contact segment 109, armature 88, contact fingers 117 and 118, which are bridged by the contact segment 110, and contact fingers 102 and 99, which are bridged by the contact segments 90 and 92, to the supply conductor 68. In the above circuit it will be noted the pilot switch and also the resistor 36 are excluded from the circuit of the feed motor. Accordingly the feed motor is operated continuously and at a relatively rapid rate.

If it is desired to effect traverse operation of the cutting tool in an opposite direction, the traverse switch 34 is moved towards the left, as shown in Fig. 2 of the drawings. A circuit is completed through the feed motor 12, which extends from the supply conductor 69 through the winding 89, contact fingers 102 and 104, which are bridged by the contact segments 97 and 98, contact fingers 117 and 118, which are bridged by the contact segment 110, armature 88, contact fingers 115 and 116, which are bridged by the contact segment 109, and contact fingers 99 and 100, which are bridged by the contact segment 96 to the supply conductor 68.

Referring to Fig. 3 of the drawings, a modification of my invention is illustrated wherein the circuit through the feed motor 12 is opened in case the circuit of such motor is maintained closed for an excessive length of time while the motor is held stationary. The system shown in Fig. 3 is adapted to be operated by the pilot switch 13 in the same manner as the system shown in Fig. 2. Accordingly, it has been deemed unnecessary to show the complete system in Fig. 3. Similar parts shown in Fig. 3 to those shown in Fig. 2 will be designated by like reference characters. The pilot switch 13 in the system shown in Fig. 3 comprises not only the contact segments shown in Fig. 2 for controlling the main motor 3 but also contact segments 150 to 154, inclusive, which engage the contact fingers 155 to 159, inclusive, for controlling the feed motor 12. The motor 12 is connected to the pilot switch through a polarized relay 160. The polarized relay 160 comprises two armatures 161 and 162, an operating coil 163, and a polarizing coil 164 which is connected to any suitable source of current.

Assuming the traverse switch 34 is in the feeding position, as shown, and the pilot switch 13 is moved towards the right, a circuit is completed through the motor 12. The circuit through the motor 12 extends from the supply conductor 69 through the winding 89, contact fingers 156 and 157, which are bridged by the contact segment 153, armature 161, reversing switch 120, contact fingers 100 and 101, which are bridged by the contact segment 94, armature 88, contact fingers 102 and 103, which are bridged by contact segment 95, reversing switch 120, coil 163, contact fingers 158 and 159, which are bridged by contact segment 154, and resistor 36 to the supply conductor 68. The current flow through the winding 163 is in such direction that the armature 161 is attracted to open the circuit of the motor 12 in case the circuit of such motor is maintained closed an excessive length of time. The operation of the polarized relay 160 is rendered slow acting in any suitable manner. The armature 162 is not attracted towards the coil 163 but is repelled from such coil. The armature 162 serves to complete a circuit through the feed motor 12 on the movement of the pilot switch 13 by the reciprocating member.

Upon movement of the pilot switch 13 towards the left, as shown in Fig. 3 of the drawings, a circuit is completed through the motor 12 which extends from the supply conductor 69 through the field magnet winding 89, contact fingers 157 and 158, which are bridged by the contact segment 151, winding 163 of the polarized relay, reversing switch 120, contact fingers 102 and 103, which are bridged by the contact segment 95, armature 88, contact fingers 100 and 101, which are bridged by contact segment 94, reversing switch 120, armature 162, contact fingers 155 and 159, which are bridged by the contact segments 150 and 152, and the resistor 36 to the supply conductor 68. The feed motor is operated in a reverse direction until stopped by the engagement between the stop member 135 and one of the stop members 136 and 137. In case the motor is stopped an excessive length of time, the armature 162 is operated to open the motor circuit. It will be noted that the direction of current flow through the coil 163 is reversed so that in the present connection, the armature 162 is in position to open the motor circuit. The armature 161 serves to complete the circuit through the feed motor upon the next movement of the pilot switch.

Modifications in the system and in the arrangement and location of parts may be made within the spirit and scope of my invention and such modifications are intended to be covered by the appended claims.

What I claim is:

1. In a control system for a machine tool, the combination with a reciprocating member and a feed motor for feeding and traversing the tool on the machine, of means for operating said motor to effect traversing operation of the tool on the machine in either direction, means for operating the motor as a torque motor during the feeding movements of the tool in accordance with the operation of said reciprocating member, and means for stopping the motor mechanically before the end of each stroke of the reciprocating member.

2. In a control system for a machine tool, the combination with a reciprocating member, a feed motor for feeding and traversing the tool on the machine, and a pilot switch operated by said reciprocating member for controlling the motor during feeding operation, of mechanical means for stopping the motor at the end of each feeding movement, and a traverse switch for connecting said motor in circuit with a resistor to said pilot switch and for effecting traverse operation of the motor in a forward and in a reverse direction, said resistor serving to effect operation of the motor as a torque motor during the feeding movements.

3. In a control system for a machine tool, the combination with a feed motor for feeding and traversing the tool on the machine, and a pilot switch for controlling the motor during feeding operation, of means for stopping the motor at the end of each feeding movement irrespective of the circuit connections of the motor, a resistor inserted in circuit with the motor and said switch for limiting the current flow through the motor when stopped during feeding operation, and a traverse switch for completing a circuit through said motor independent of said resistor to effect traverse operation in either direction.

4. In a control system for a machine tool, the combination with a feed motor, a pilot switch for controlling the motor during feeding operation, and means for mechanically stopping said motor to limit each feeding movement, of a resistor, a traverse switch for connecting the motor in circuit with the resistor to said pilot switch and for operating the motor continuously and independent of said resistor and the pilot switch, said resistor serving to protect the motor against excessive current flow when stopped at the end of each feeding movement.

5. In a control system for a machine tool, the combination with a reciprocating member, a feed motor for feeding and traversing the tool on the machine, and a pilot switch operated by said reciprocating member for reversing the direction of rotation of the motor, of means for stopping the motor during each stroke of the reciprocating member irrespective of the circuit connections of the motor, a resistor, and a traverse switch for connecting said motor in circuit with the resistor to said pilot switch and for effecting traverse operation of the motor in a forward and in a reverse direction, said resistor serving to effect operation of the motor as a torque motor during the feeding movements.

6. In a control system for a machine tool, the combination with a reciprocating member, a feed motor for feeding and traversing the tool on the machine, and a pilot switch operated by said reciprocating member for controlling the motor during feeding operation, of a traverse switch for connecting the motor to said pilot switch and for effecting traverse operations of the motor in a forward and in a reverse direction, means for mechanically stopping the motor at the end of each feeding movement, and a resistor connected in the motor circuit to the pilot switch for preventing an excessive current flow through the motor when stopped at the end of a feeding movement.

7. In a control system for a machine tool, the combination with a reciprocating member, a feed motor for feeding and traversing the tool on the machine, and a pilot switch for reversing the direction of rotation of the feed motor in accordance with the operation of the reciprocating member, of means for stopping the feed motor at the end of each feeding movement prior to the operation of the pilot switch to reverse the motor connections, and a traverse switch for connecting said motor in circuit with a resistor to said pilot switch and for effecting traverse operation of the feed motor in a forward and in a reverse direction, said resistor serving to protect the motor against excessive current flow when stopped at the end of each feeding movement.

8. In a control system, the combination with a reciprocating member, a motor, a pilot switch for reversing the direction of rotation of the motor in accordance with the operation of the reciprocating member, and means for mechanically stopping the motor at the end of each movement of the reciprocating member prior to the reversing of the connections therefor by the pilot switch, of a resistor adapted to be connected in circuit with the motor and the pilot switch, said resistor serving to protect the motor against excessive current flow when stopped at the end of each movement.

9. In a control system for a machine tool, the combination with a reciprocating member, a feed motor for feeding and traversing the tool on the machine, a pilot switch for reversing the direction of rotation of the feed motor in accordance with the operation of the reciprocating member, and means for mechanically stopping the feed motor at the end of each feeding movement and prior to the reversal in the motor connections by said pilot switch, of a resistor, a traverse switch for connecting the feed motor in circuit with the resistor to said pilot switch during feeding operation and for effecting traverse operation by the motor in a forward and in a reverse direction independently of the pilot switch and of the said resistor.

10. In a control system for a machine tool, the combination with a reciprocating member, a feed motor for feeding and traversing the tool on the machine, means comprising a pilot switch for controlling the operation of the reciprocating member and for reversing the direction of rotation of the feed motor during feeding operation, and means for stopping the feed motor at the end of each feeding movement irrespective of the circuit connections thereof and prior to the reversal of the direction of rotation of the feed motor by the pilot switch, of means for operating the feed motor to effect traverse operation of the tool in either direction and for connecting the feed motor through the pilot switch to effect feeding movements of the motor, and means inserted in the circuit of the motor during feeding operation to protect the motor against excessive current flow when stopped at the end of each feeding movement prior to the reversal in the direction of rotation thereof.

11. In a control system for a machine tool, the combination with a reciprocating member, means for operating said reciprocating member, a pilot switch controlled by said reciprocating member and adapted to control said operating means, a feed motor controlled by said pilot switch, and mechanical means for stopping the feed motor to limit each feeding movement prior to the opening of the feed motor circuit by the pilot switch, of a resistor, a traverse switch for connecting the motor in circuit with the resistor to said pilot switch and for operating the motor continuously in a forward and in a reverse direction independent of said resistor and the pilot switch, said resistor serving to protect the motor against excessive current flow when stopped at the end of each feeding movement.

12. In a control system for a machine tool, the combination with a reciprocating member, a main motor for operating the reciprocating member, a feed motor for feeding and traversing the tool on the machine, a pilot switch operated by said reciprocating member for controlling the feed motor and the main motor, and mechanical means for stopping the feed motor at the end of each feeding movement, of a resistor, a traverse switch for connecting said feed motor in circuit with the resistor to said pilot switch and for effecting traverse operation of the feed motor in a forward and in a reverse direction, said resistor serving to protect the feed motor against an excessive current flow when stopped at the end of each feeding movement prior to the change in the circuit connections therefor by the pilot switch.

13. In a control system for a machine tool, the combination with a reciprocating member, a main motor for operating said reciprocating member, a pilot switch operated by said reciprocating member, a feed motor for effecting feeding and traverse movement of the tool on the machine, and means for mechanically stopping the feed motor at the end of each feeding movement, of a resistor, a traverse switch for connecting the feed motor in circuit with the resistor to said pilot switch and for operating the feed motor continuously in a forward and in a reverse direction independent of said resistor and the pilot switch, the pilot switch serving to reverse the direction of rotation of the feed motor in accordance with the operation of the reciprocating member, said resistor serving to protect the motor against excessive current flow when stopped at the end of each feeding movement.

14. In a control system for a machine tool, the combination with a reciprocating member, a feed motor, a pilot switch for reversing the direction of rotation of the motor in accordance with the operation of said reciprocating member, and means for mechanically stopping the feed motor at the end of each feeding movement prior to the reversal in the motor connections by said pilot switch, of a resistor, a traverse switch for connecting the motor in circuit with the resistor to said pilot switch and for effecting traverse operation of the motor independent of the pilot switch and of said resistor, and means for opening the feed motor circuit in case such motor is stopped an excessive length of time with the circuit thereof closed.

15. In a control system for a machine tool, the combination with a reciprocating member, a feed motor for feeding and traversing the tool on the machine, a pilot switch operated by said reciprocating member for reversing the direction of rotation of the feed motor, and means for mechanically stopping the feed motor at the end of each feeding movement and prior to the reversal of the connections thereof by said pilot switch, of means comprising a polarized relay in the circuit of the motor and the pilot switch for opening the motor circuit in case the motor is stopped an excessive length of time with its circuit closed.

16. In a control system for a machine tool, the combination with a reciprocating member, a feed motor for feeding and traversing the tool on the machine, a pilot switch operated by said reciprocating member for reversing the direction of rotation of the feed motor, and means for mechanically stopping the feed motor at the end of each feeding movement and prior to the reversal of the connections thereof by said pilot switch, of means comprising a polarized relay in the circuit of the motor and the pilot switch for opening the motor circuit in case the motor is stopped an excessive length of time with its circuit closed, a resistor, and a traverse switch for connecting the motor in circuit with the resistor to the pilot switch during feeding operation and for effecting traverse operation of the motor in a forward and a reverse direction independent of the pilot switch and said resistor.

17. In a control system for a machine tool, the combination with a reciprocating member, a feed motor, a pilot switch operated by said reciprocating member for reversing the direction of rotation of the feed motor at each end of the stroke of the reciprocating member, and mechanical means for stopping the motor to limit the feeding movements, of automatic means for opening the motor circuit in case the motor has been stopped an excessive length of time before the circuit connections thereof are reversed by the pilot switch.

18. In a control system for a machine tool, the combination with a reciprocating member, a feed motor, a pilot switch operated by the reciprocating member for reversing the direction of rotation of the motor, and means for stopping the feed motor irrespective of the circuit connections thereof and prior to the operation of the pilot switch, of a polarized relay having two armatures inserted in the circuit of the motor and the pilot switch, said relay serving to open the motor circuit in case the motor is stopped an excessive length of time before the pilot switch is operated to reverse the motor connections, said relay being so connected that when one of said armatures is operated to open the motor circuit, the other armature serves to complete the motor circuit through the pilot switch upon the next operation of the pilot switch.

19. In a control system for a machine tool, the combination with a reciprocating member, a feed motor, a pilot switch operated by said reciprocating member for reversing the direction of rotation of the feed motor at each end of the stroke of the reciprocating member, and mechanical means for stopping the motor to limit the feeding movements, of means comprising a polarized relay having two armatures in the circuit of the motor and the pilot switch for opening the motor circuit in case the motor is stopped an excessive length of time with its circuit closed, said relay being so connected that when the motor circuit is opened by one armature the second armature serves to complete the circuit through the motor upon the next reversal of the pilot switch.

20. In a control system for a machine tool, the combination with a reciprocating member, a main motor for operating the reciprocating member, a feed motor for feeding and traversing the tool on the machine, a pilot switch operated by said reciprocating member for controlling the operation of the main motor and for reversing the direction of rotation of the feed motor, and means for mechanically stopping the feed motor to limit the feeding movement prior to the reversal of the motor connections by the pilot switch, of means comprising a relay in the circuit of the feed motor and the pilot switch for opening the feed motor circuit in case such motor is stopped an excessive length of time before operation of the pilot switch for reversing the connections thereof, a resistor, and a traverse switch for connecting the feed motor in circuit with the resistor to the pilot switch during feeding operation and for effecting traverse operation of the feed motor is a forward and in a reverse direction independent of the said pilot switch and said resistor.

21. In a control system for a machine tool, the combination with a reciprocating member, a feed motor, a pilot switch for reversing the direction of rotation of the feed motor in accordance with the operation of the reciprocating member, and mechanical means for stopping the feed motor prior to the operation of the pilot switch at each end of the stroke of the reciprocating member, of a traverse switch for connecting the motor to the pilot switch and for effecting traverse operation of the motor independent of the pilot switch, and means for opening the motor circuit in case the motor is stopped an excessive length of time before the circuit connections thereof are reversed by the pilot switch.

In testimony whereof, I hereto affix my signature.

HAROLD L. BLOOD.